US012327380B2

(12) United States Patent
Dore et al.

(10) Patent No.: US 12,327,380 B2
(45) Date of Patent: Jun. 10, 2025

(54) 3D SCENE TRANSMISSION WITH ALPHA LAYERS

(71) Applicant: InterDigital CE Patent Holdings, Paris (FR)

(72) Inventors: Renaud Dore, Rennes (FR); Bertrand Chupeau, Cesson-Sevigne (FR); Benoit Vandame, Betton (FR); Julien Fleureau, Rennes (FR); Didier Doyen, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 239 days.

(21) Appl. No.: 17/921,290

(22) PCT Filed: Apr. 27, 2021

(86) PCT No.: PCT/EP2021/060908
§ 371 (c)(1),
(2) Date: Oct. 25, 2022

(87) PCT Pub. No.: WO2021/224056
PCT Pub. Date: Nov. 11, 2021

(65) Prior Publication Data
US 2023/0186522 A1     Jun. 15, 2023

(30) Foreign Application Priority Data

May 6, 2020   (EP) .................................... 20205451
Jun. 22, 2020  (EP) .................................... 20305682

(51) Int. Cl.
*G06T 9/00* (2006.01)
*G06T 15/04* (2011.01)

(52) U.S. Cl.
CPC ................ *G06T 9/00* (2013.01); *G06T 15/04* (2013.01)

(58) Field of Classification Search
CPC .................................. G06T 9/00; G06T 15/04
See application file for complete search history.

(56) References Cited

U.S. PATENT DOCUMENTS 5,768,438 A * 6/1998 Etoh .................... H04N 19/543
                                                     375/E7.111
6,111,979 A * 8/2000 Katto ...................... G06T 9/001
                                                     382/232

(Continued)

FOREIGN PATENT DOCUMENTS

GB        2572996 A    10/2019

OTHER PUBLICATIONS

"Working Draft 5 of Immersive Video", Motion Picture Expert Group or ISO/IEC JTC1/SC29/WG11, No. n19212, pp. 1-66, Jun. 9, 2020.

(Continued)

*Primary Examiner* — Charles L Beard
(74) *Attorney, Agent, or Firm* — Xiaoan Lu

(57) ABSTRACT

To represent a 3D scene, the MPI format uses a set of fronto-parallel planes. Different from MPI, the current MIV standard accepts a 3D scene represented as sequence input pairs of texture and depth pictures as input. To enable transmission of an MPI cube via the MIV-V3C standard, in one embodiment, an MPI cube is divided into empty regions and local MPI partitions that contain 3D objects. Each partition in the MPI cube can be projected to one or more patches. For a patch, the geometry is generated as well as the texture attribute and alpha attributes, and the alpha attributes may be represented as a peak and a width of an impulse. In another embodiment, an MPI RGBA layer of the MPI is cut into sub-images. Each sub-image may correspond to a patch, and the RGB and alpha information of the sub-image are assigned to the patch.

20 Claims, 10 Drawing Sheets

(56) References Cited

U.S. PATENT DOCUMENTS

| | | | | |
|---|---|---|---|---|
| 6,229,930 B1* | 5/2001 | Kadono | ............... | G06V 20/49 |
| | | | | 382/284 |
| 6,275,530 B1* | 8/2001 | Nishi | ............... | H04N 19/15 |
| | | | | 375/E7.176 |
| 9,264,585 B2* | 2/2016 | Chauvier | ............... | H04N 13/167 |
| 9,311,737 B1* | 4/2016 | Wrenninge | ............... | G06T 13/20 |
| 9,704,270 B1* | 7/2017 | Main | ............... | G06T 15/60 |
| 10,881,956 B2* | 1/2021 | Madajczak | ............... | G06T 15/503 |
| 12,058,310 B2* | 8/2024 | Zhu | ............... | H04N 19/30 |
| 2005/0117789 A1* | 6/2005 | Kim | ............... | H04N 19/20 |
| | | | | 375/E7.076 |
| 2006/0050787 A1* | 3/2006 | Winger | ............... | H04N 19/30 |
| | | | | 375/E7.088 |
| 2009/0167785 A1* | 7/2009 | Wong | ............... | G06T 15/503 |
| | | | | 345/629 |
| 2011/0032251 A1* | 2/2011 | Pothana | ............... | G06T 15/04 |
| | | | | 345/419 |
| 2011/0211815 A1* | 9/2011 | Yamashita | ............... | H04N 13/128 |
| | | | | 386/E5.028 |
| 2012/0170916 A1* | 7/2012 | Yamashita | ............... | H04N 13/156 |
| | | | | 386/355 |
| 2013/0034171 A1* | 2/2013 | Winken | ............... | H04N 19/147 |
| | | | | 375/E7.026 |
| 2013/0069933 A1* | 3/2013 | Smithwick | ............... | G02B 30/27 |
| | | | | 359/462 |
| 2013/0229414 A1* | 9/2013 | Gruber | ............... | G06T 15/04 |
| | | | | 345/506 |
| 2013/0321576 A1* | 12/2013 | Macq | ............... | H04N 13/111 |
| | | | | 348/43 |
| 2015/0186744 A1* | 7/2015 | Nguyen | ............... | H04N 19/46 |
| | | | | 382/190 |
| 2015/0188973 A1* | 7/2015 | Kacmarcik | ............... | H04L 67/131 |
| | | | | 715/719 |
| 2015/0195544 A1* | 7/2015 | Dev | ............... | H04N 19/182 |
| | | | | 375/240.26 |
| 2016/0029030 A1* | 1/2016 | Mrak | ............... | H04N 19/593 |
| | | | | 375/240.12 |
| 2017/0332085 A1* | 11/2017 | Ramasubramonian | ............... | |
| | | | | H04N 19/167 |
| 2017/0358092 A1* | 12/2017 | Bleibel | ............... | H04N 5/272 |
| 2017/0358126 A1* | 12/2017 | Lim | ............... | G06T 17/20 |
| 2018/0054630 A1* | 2/2018 | Chang | ............... | H04N 19/17 |
| 2019/0079639 A1* | 3/2019 | Lindberg | ............... | H04N 19/17 |
| 2019/0139296 A1* | 5/2019 | Lakshman | ............... | G06T 7/596 |
| 2019/0222623 A1* | 7/2019 | Huang | ............... | H04N 19/172 |
| 2019/0227641 A1* | 7/2019 | Douglas | ............... | G06F 3/0346 |
| 2020/0120324 A1* | 4/2020 | Kwong | ............... | H04N 13/111 |
| 2020/0314407 A1* | 10/2020 | Otsuka | ............... | G06T 7/38 |
| 2021/0006776 A1* | 1/2021 | Lee | ............... | H04N 13/393 |
| 2021/0049828 A1* | 2/2021 | Park | ............... | H04N 19/30 |
| 2021/0174472 A1* | 6/2021 | Taylor | ............... | G06T 5/50 |
| 2021/0192782 A1* | 6/2021 | Tobler | ............... | G06V 10/462 |
| 2021/0211593 A1* | 7/2021 | Overbeck | ............... | G06T 15/06 |
| 2021/0327121 A1* | 10/2021 | Kongsilp | ............... | G06F 3/016 |
| 2021/0368157 A1* | 11/2021 | Overbeck | ............... | H04N 13/161 |
| 2022/0007040 A1* | 1/2022 | Ward | ............... | H04N 23/73 |
| 2022/0114784 A1* | 4/2022 | Schickel | ............... | G06T 17/00 |
| 2022/0207663 A1* | 6/2022 | Carbonera Luvizon | .. | G06T 5/77 |
| 2022/0245910 A1* | 8/2022 | Lombardi | ............... | G06T 13/40 |
| 2022/0279185 A1* | 9/2022 | Zhu | ............... | H04N 19/82 |
| 2022/0319099 A1* | 10/2022 | Watanabe | ............... | G06T 15/08 |
| 2022/0409995 A1* | 12/2022 | Bevensee | ............... | A63F 13/27 |
| 2023/0009367 A1* | 1/2023 | Goodman | ............... | G06T 7/73 |
| 2023/0033968 A1* | 2/2023 | Na | ............... | G06T 7/90 |
| 2023/0036418 A1* | 2/2023 | Leendertz | ............... | G03H 1/22 |
| 2023/0070102 A1* | 3/2023 | Mory | ............... | G06T 15/503 |
| 2023/0080852 A1* | 3/2023 | Meardi | ............... | H04N 19/597 |
| | | | | 382/232 |
| 2023/0177771 A1* | 6/2023 | Assarsson | ............... | G06T 15/06 |
| | | | | 345/420 |
| 2023/0196659 A1* | 6/2023 | Luvizon | ............... | G06T 9/00 |
| | | | | 345/427 |
| 2023/0224501 A1* | 7/2023 | Chupeau | ............... | H04N 21/2353 |
| | | | | 375/240.08 |
| 2023/0237616 A1* | 7/2023 | Chiang | ............... | G06T 15/205 |
| | | | | 345/419 |
| 2023/0326050 A1* | 10/2023 | Werlberger | ............... | G06T 7/90 |
| | | | | 382/106 |
| 2023/0360272 A1* | 11/2023 | Janus | ............... | G06T 9/00 |
| 2023/0362409 A1* | 11/2023 | Chupeau | ............... | G06V 10/762 |
| 2023/0377250 A1* | 11/2023 | Butyn | ............... | G06T 15/205 |
| 2023/0379495 A1* | 11/2023 | Fleureau | ............... | H04N 19/597 |
| 2023/0401785 A1* | 12/2023 | Ramirez Solorzano | ............... | |
| | | | | G06V 10/56 |
| 2023/0401789 A1* | 12/2023 | Shang | ............... | H04S 7/302 |
| 2024/0013475 A1* | 1/2024 | Fleureau | ............... | H04N 21/816 |
| 2024/0021318 A1* | 1/2024 | Wesolowski | ............... | G16H 50/20 |
| 2024/0062402 A1* | 2/2024 | Varekamp | ............... | H04N 13/189 |
| 2024/0066710 A1* | 2/2024 | Sundaralingam | ...... | B25J 19/023 |
| 2024/0087205 A1* | 3/2024 | Omata | ............... | G06F 3/01 |
| 2024/0185507 A1* | 6/2024 | Sabater | ............... | G06T 15/503 |
| 2024/0193857 A1* | 6/2024 | Chupeau | ............... | H04N 21/21805 |
| 2024/0196011 A1* | 6/2024 | Drazic | ............... | H04N 21/234327 |
| 2024/0212098 A1* | 6/2024 | Pourian | ............... | G06T 7/194 |
| 2024/0214534 A1* | 6/2024 | Kroon | ............... | H04N 19/597 |
| 2024/0223767 A1* | 7/2024 | Yang | ............... | G06T 15/00 |
| 2024/0244259 A1* | 7/2024 | Doyen | ............... | G03H 1/08 |
| 2024/0267569 A1* | 8/2024 | Kirchhoffer | ......... | H04N 19/593 |

OTHER PUBLICATIONS

"Working Draft 4 of Immersive Video", Motion Picture Expert Group or ISO/IEC JTC1/SC29/WG11, No. N19001, pp. 1-69, Mar. 8, 2020.

Chupeau et al., "Per patch quantization", Motion Picture Expert Group or ISO/IEC JTC1/SC29/WG11, No. m54780, pp. 1-3, Jun. 29, 2020.

Zhou et al., "Stereo Magnification: Learning View Synthesis using Multiplane Images", Association for Computing Machinery, ACM Transactions on Graphics, vol. 37, Issue 4, Article 65, 12 pages, Aug. 2018.

* cited by examiner

3D SCENE TRANSMISSION WITH ALPHA LAYERS

CROSS REFERENCE TO RELATED APPLICATIONS

This application is a U.S. National Stage Application under 35 U.S.C. 371 of International Patent Application No. PCT/EP2021/060908, filed Apr. 27, 2021, which is incorporated herein by reference in its entirety.

This application claims the benefit of European Patent Application Nos. EP20305682.5 filed Jun. 22, 2020 and EP20305451.5 filed May 6, 2020, each of which is incorporated herein by reference in its entirety.

TECHNICAL FIELD

The present embodiments generally relate to a method and an apparatus for transmission of a 3D scene with alpha layers in its representation.

BACKGROUND

To represent a 3D scene, an alpha component can be used to indicate the transparency of the objects in the scene. In addition to that, there may be uncertainty in depth that is output from a depth generation process, for example, when the information of the input RGB cameras is not enough to be affirmative about the presence of a surface, or where a pixel captures a mix of different parts of the scene. This depth uncertainty is typically converted into the alpha component between 0 and 1, in order to allow intermediate view synthesis with graceful degradation at the difficult part of the scene instead of visible visual artefacts. Usually, alpha=0 indicates absence of material, and alpha=1 indicates it is certain there is a fully opaque surface.

SUMMARY

According to an embodiment, a method for encoding data representative of a 3D scene is provided, comprising: accessing a 3D scene represented using a volumetric scene representation with a plurality of RGBA layers, wherein each RGBA layer contains a color image and an alpha map; converting said volumetric scene representation to another scene representation format, wherein a sequence pair of texture pictures and depth pictures is used to represent a view in said 3D scene in said another scene representation format; and encoding data associated with said another scene representation format. In one example, said another scene representation format may be conformant with Metadata for Immersive Video (MIV), and Multiplane Image (MPI) is used for said volumetric scene representation format.

According to another embodiment, a method for decoding a 3D scene is provided, comprising: decoding data for a 3D scene represented with a scene representation format, wherein a sequence pair of texture pictures and depth pictures is used to represent a view in said 3D scene in said scene representation format; and converting said scene representation to a volumetric scene representation format with a plurality of RGBA layers, wherein each RGBA layer contains a color image and an alpha map. In one example, said scene representation format may be conformant with MIV, and MPI is used for said volumetric scene representation format.

According to another embodiment, an apparatus for encoding data representative of a 3D scene is provided, comprising one or more processors, wherein said one or more processors are configured to: access a 3D scene represented using a volumetric scene representation with a plurality of RGBA layers, wherein each RGBA layer contains a color image and an alpha map; convert said volumetric scene representation to another scene representation format, wherein sequence pairs of texture pictures and depth pictures are used to represent a view in said 3D scene in said another scene representation format; and encode data associated with said another scene representation format. In one example, said another scene representation format may be conformant with MIV, and MPI is used for said volumetric scene representation format.

According to another embodiment, an apparatus for decoding a 3D scene is provided, comprising one or more processors, wherein said one or more processors are configured to: decode data for a 3D scene represented with a scene representation format, wherein sequence pairs of texture pictures and depth pictures are used to represent a view in said 3D scene in said scene representation format; and convert said scene representation to a volumetric scene representation format with a plurality of RGBA layers, wherein each RGBA layer contains a color image and an alpha map. In one example, said scene representation format may be conformant with MIV, and MPI is used for said volumetric scene representation format.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding 3D scene data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

DETAILED DESCRIPTION

Figure 1:
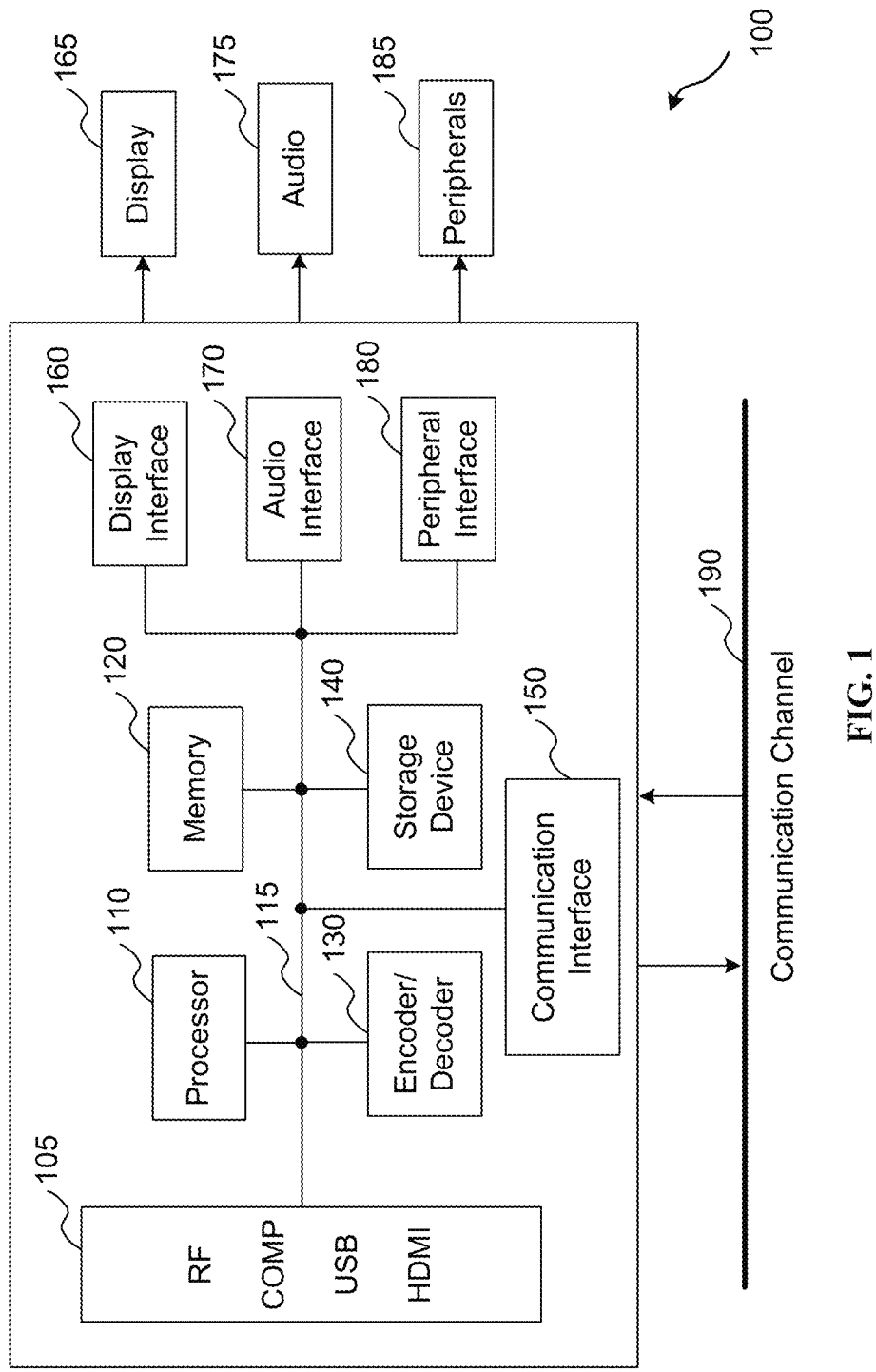
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

As described before, an alpha value may be used to indicate transparency of scene parts, for example, for transparent material or tiny geometry object that does not completely occlude the background such as fine leaf plant, or to indicate uncertainty on the existence of a surface at that location. To represent a 3D scene, the alpha component can be included in the scene representation, for example, under the scene representation format called MPI (MultiPlane Image). The global scene representation adopted in MPI is a set of fronto-parallel planes at a fixed range of depths with respect to a reference coordinate frame, where each plane d encodes an RGB color image $C_d$ and an alpha/transparency map $\alpha_d$. MPI representation can be described mathematically as a collection of RGBA layers $\{(C_1, \alpha_1), \ldots, (C_D, \alpha_D)\}$, where D is the number of depth planes. The RGBA images correspond to z-planes located under a 1/z law common to depth quantization in 3DoF+ (e.g., as specified in ISO/IEC 23090-12, i.e., part 12 of MPEG-I) use case with perspective or equirectangular views. The MPI has a dimension of width×height×D at least, where width and height are the horizontal and vertical resolutions of the reference view, respectively. For ease of notations, we also refer to the collection of RGBA layers in the MPI format as the MPI cube.

Figure 2:
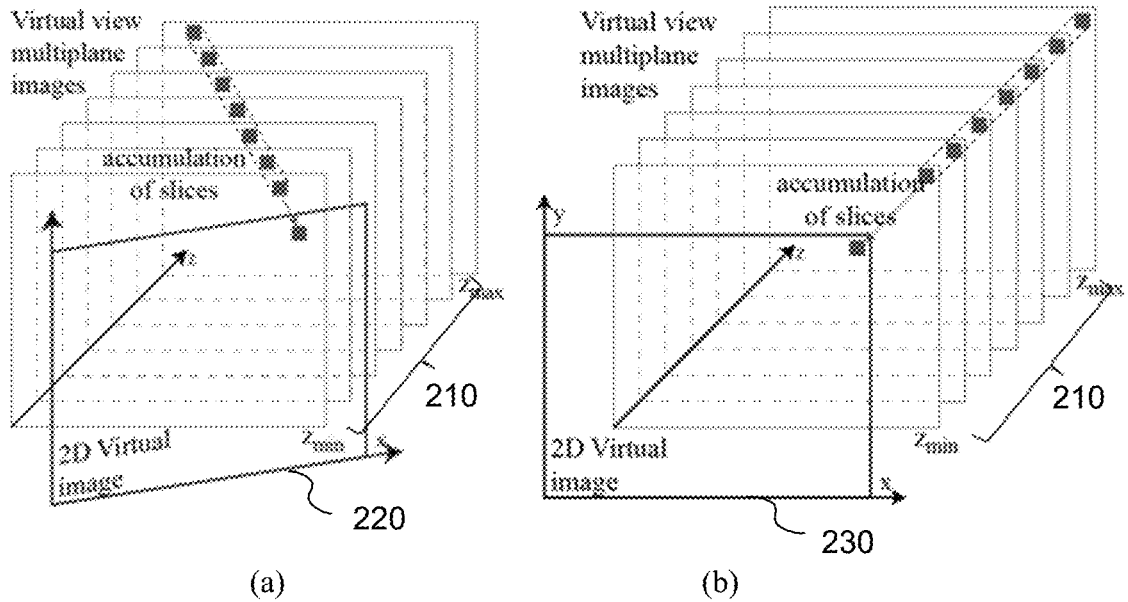
FIG. 2(a) and FIG. 2(b) illustrate an example of an MPI cube from two different viewports.

As illustrated in FIG. 2, the MPI (210) is a set of z-planes that includes the whole range from Zmin to Zmax and orthogonal to the reference camera optical axis (e.g., z axis as in FIG. 2(a) and FIG. 2(b)). It is convenient to represent the z-planes in a cube in an iso-metrical projection, although it typically has the shape of perspective camera frustum in case of perspective view. Z-planes are not placed equidistant but rather according to the well-known 1/z law, meaning that the inter-plane distance increases with the z value, which allows to leverage the fact that the further away the scene detail is, the less depth accuracy it needs when seen from the reference camera.

Every z-plane is an RGB+Alpha (RGBA) image. From the MPI cube, it is possible to generate any viewport (220, 230) not too off-axis from the reference view by computing the RGB value from foreground to background weighted by alpha accumulation related factors. A pixel in the viewport will be the integration result along the z-axis. Note that there might exist several MPIs to represent a scene, for example located on each corner of the scene in order to capture different occluded regions.

Figure 3:
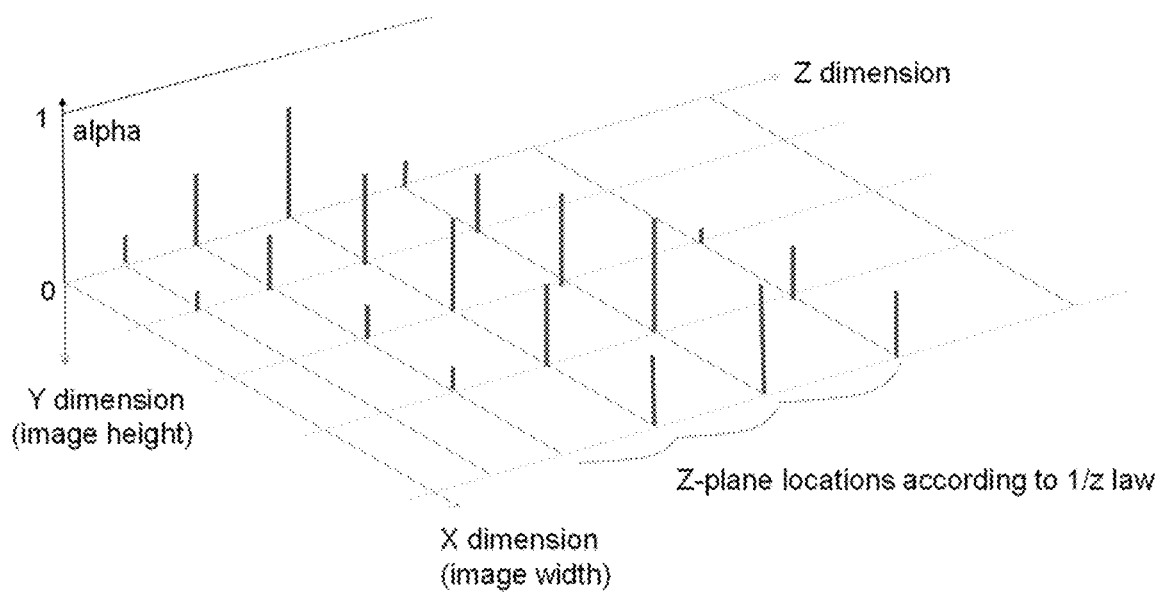
FIG. 3 illustrates an example of a (x, z) section view of alpha values in Reference View MPI.

In an example, FIG. 3 illustrates the alpha values of an MPI cube. As it is difficult to show for each (x, y, z) position, we only show a section in the (x, z) plane. Along a ray (Z dimension), several typical profiles may be observed:

When a surface has been well detected, there will be a narrow peak reaching almost alpha value 1.

When the depth generation process is not able to finely identify a surface, the peak will degenerate into an impulse lower than 1 and with a certain width.

When there is a true transparent material in front of background, there will be two impulses on the ray.

We could represent for each of the R, G and B components similarly as in FIG. 3. The profile of each component along the z-ray would exhibit values very close to each other between successive positions, yet not necessarily identical. Therefore, we could say that the R, G and B profile may also have a sort of distribution.

Different from the MPI representation, MIV (Metadata for Immersive Video, part 12 of MPEG-I) working draft 5 accepts a 3D scene represented as sequence input pairs of texture and depth pictures as input, where each of the sequence pairs represents a view of the 3D scene. For ease of notations, we call this representation as the MIV representation. The content of texture and depth pictures are pruned to remove redundancies to generate texture attribute atlases and geometry (depth) atlases. The atlases can then be encoded with a video encoder, for example, using an HEVC or VVC encoder, and metadata indicating how to restore each patch of the atlases back to the scene can be encoded according to MIV.

According to the MIV specification, a patch is a rectangular region within an atlas that corresponds to a rectangular region within a view representation. An atlas contains an aggregation of one or more patches from one or more view representations, with a corresponding texture component and depth component. An atlas patch occupancy map is a 2D array corresponding to an atlas whose values indicate for each sample position in the atlas which patch the sample corresponds to, or if the sample is invalid. Note that the MIV specification refers to V3C (Volumetric Visual Video Coding, part 5 of MPEG-I) for features that are common with V-PCC (Video-Point Cloud Compression), and we may refer to the MIV standard as the MIV-V3C standard.

Typically, an MPI cube is largely empty. In particular, while there are voxels (pixels positioned in 3D) with non-zero alpha values mostly at the position of the scene surfaces, many voxels in the MPI cube have zero alpha value. To enable the transmission of an MPI cube via the MIV-V3C standard, we leverage the surface sparsity of the MPI representation by using the patch concept to express the information locally in the MPI cube. Consequently, we may get rid of large empty regions. Different embodiments are described below to convert an MPI scene representation to an MIV scene representation for transmission.

Embodiment 1: Using Depth Map and Distribution of Attributes

Figure 4:
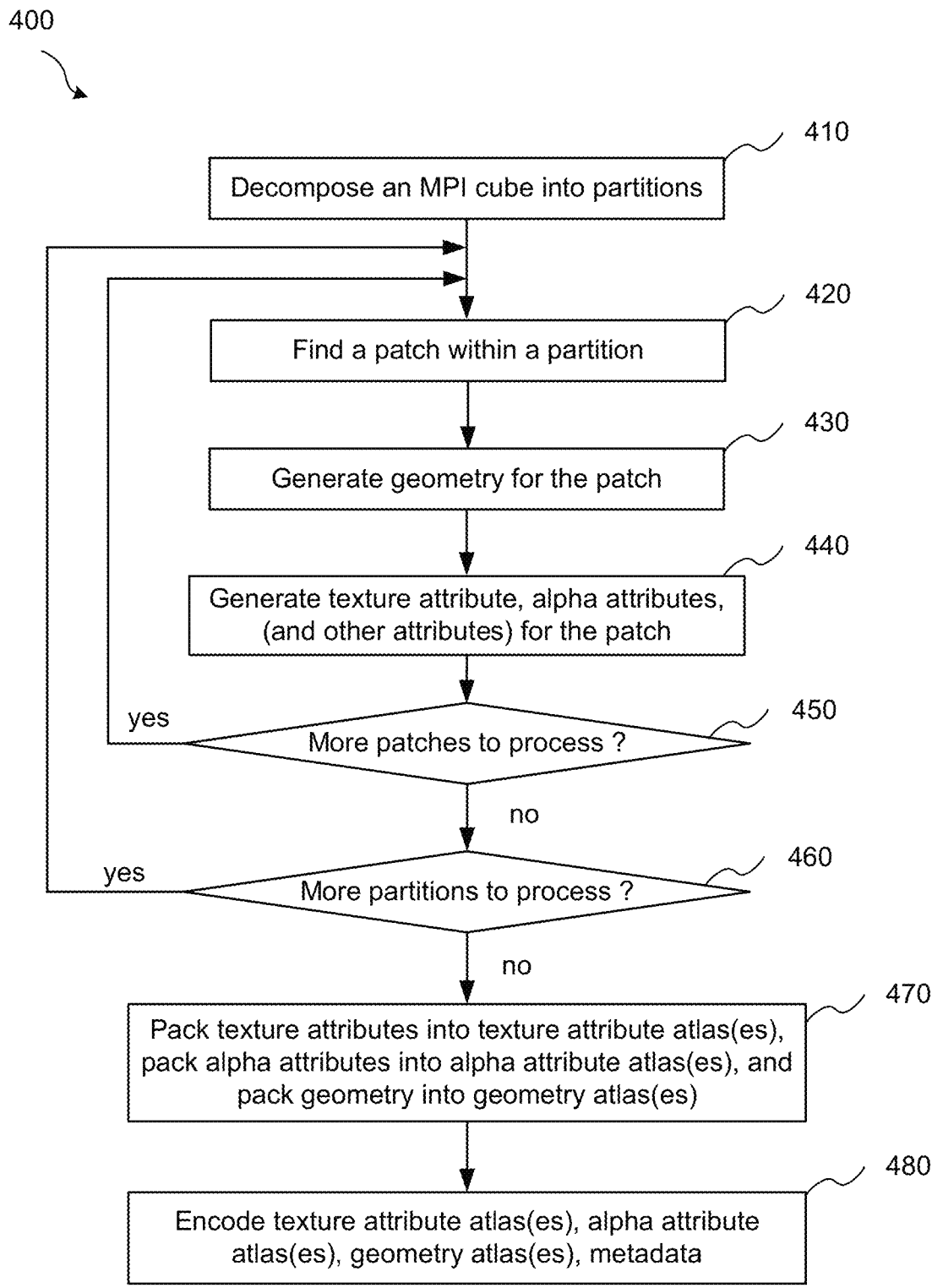
FIG. 4 illustrates a method of encoding a 3D scene in an MPI representation using an MIV representation, according to an embodiment.

FIG. 4 illustrates method 400 of encoding an MPI cube by converting an MPI representation of a 3D scene to an MIV scene representation, according to an embodiment. In this embodiment, an MPI cube is divided (410) into empty regions and local MPI partitions that contain 3D objects, as illustrated in an example in FIG. 5.

Each partition in the MPI cube can be projected to one or more patches according to the MIV representation. Here, a patch is a 2D rectangular surface able to receive the result of the projection of a part of the local partition. The size and the number of patches for a partition are to be found (420) on the fly during a clustering process. Once some material in a partition is projected onto a patch, this material is removed from the partition.

For a patch, the geometry (depth) is generated (430, 440), as well as the texture attribute, alpha attributes and optionally other attributes. All patches are found (450) for a partition when there is no more material in this local partition to project. The process is repeated (460) for all partitions in the MPI cube. Then the texture attributes can be packed (470) into one or more texture atlases, the alpha attributes into one or more alpha attribute atlases, and geometry into one or more geometry atlases. The texture attribute atlases and the geometry atlases can be encoded (480), for example, using an HEVC video encoder, and the metadata can be encoded. The metadata may indicate the location of the partition, (x,y) offset position in the MPI plane of one given patch corner (for example, upper-left corner), width and height of the patch, (x, y) offset position of this patch in the atlas, and the related partition it belongs to. Other attributes, if present, can also be encoded. The size of the partitions is typically not determined for a given frame but rather per intra-period through a temporal aggregation. The increased partition size allows to take into account the displacement during the intra-period of the non-empty material within the partition boundaries, and to send the related metadata at the rate of the intra-period only, as described in the MIV specification.

MPI Split (410)

Figure 5:
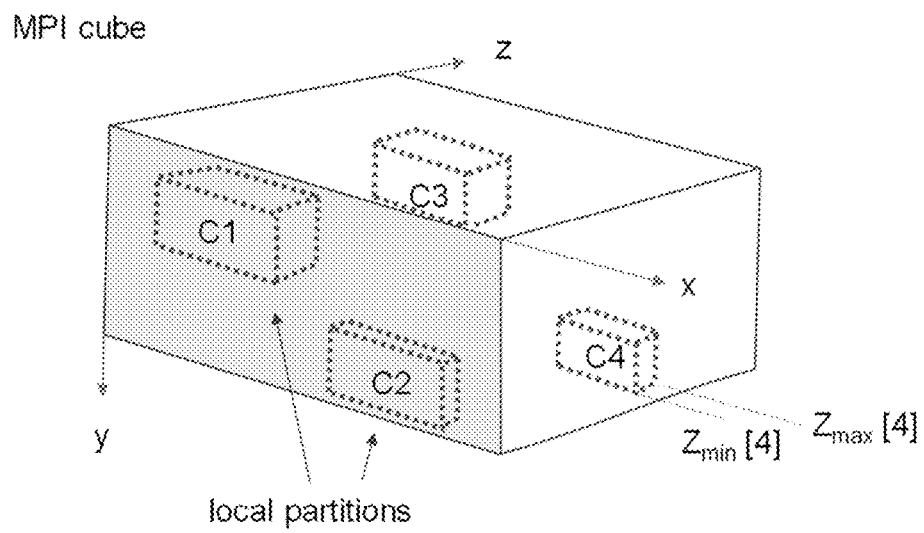
FIG. 5 illustrates split of an MPI into local partitions.

In particular, FIG. 5 illustrates an example where an MPI cube can be split to contain small local rectangular parallelepiped, namely "partitions." In FIG. 5, four local partitions (C1, C2, C3, C4) are shown, and the extreme value of z (Zmin and Zmax) has also been indicated for local partition C4. The partitions usually are placed where there are visual objects in the 3D space. Outside these partitions, there are no visual objects (empty), meaning that alpha is zero or considered to be zero.

For each of these local partitions, one or more patches can be defined according to the MIV specification. It is possible for these partitions to intersect to each other. The MIV specification specifies the (x, y) upper-left position of the partition. Here, we propose to further include the Zmin and/or Zmax values for each partition, where Zmin is the index of the fronto-parallel plane of the partition that is closest to the fronto-parallel plane of the MPI cube, and Zmax is the index of the fronto-parallel plane of the partition that is furthest away from the fronto-parallel plane of the MPI cube.

One MPI cube will be related to a view as defined in the MIV specification. If there are multiple MPIs to transmit, there will be multiple views, and patches will be possibly mixed among different atlases. In one embodiment, we propose to transmit Zmin, and possibly also Zmax, for each patch.

Figure 6:
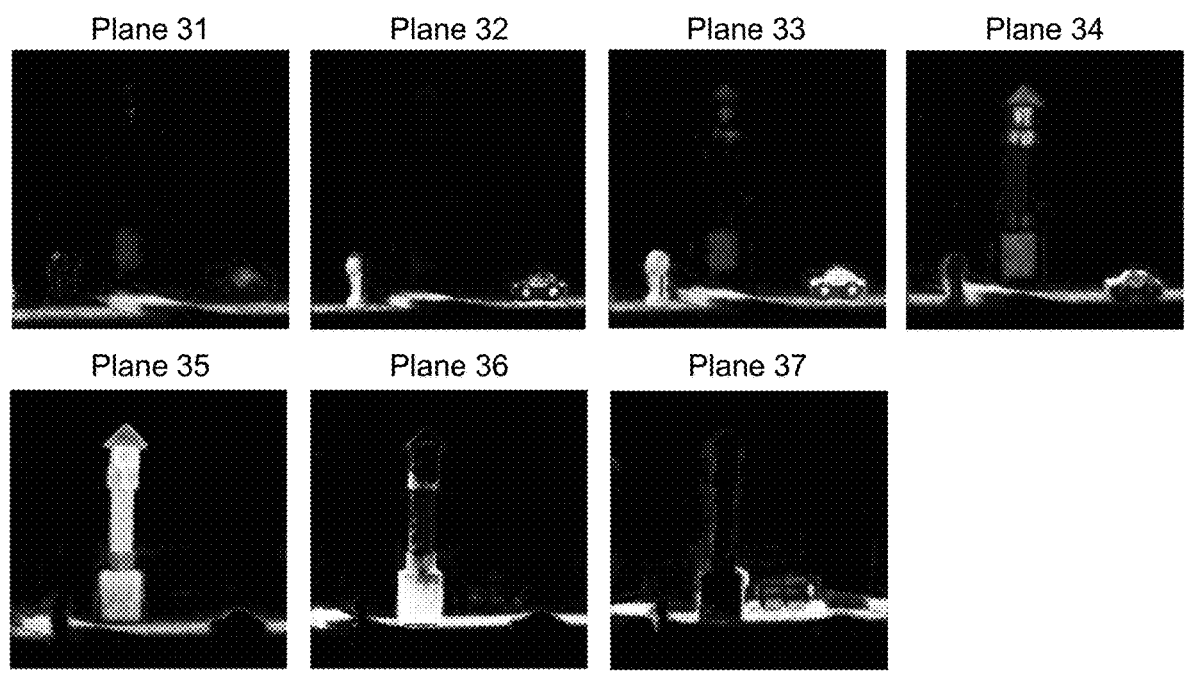
FIG. 6 illustrates an example of an MPI stack of planes within a local partition.

FIG. 6 illustrates an example of an MPI local partition for scene detail. This partition includes the width×height windows of planes 31 to 37, and each plane corresponds to a z-plane of the scene. For the purpose of presentation, the alpha transparent value appears as black and partially transparent value (e.g., between 0 and 1) will look like darker as well.

Depth Generation (430)

Figure 7:
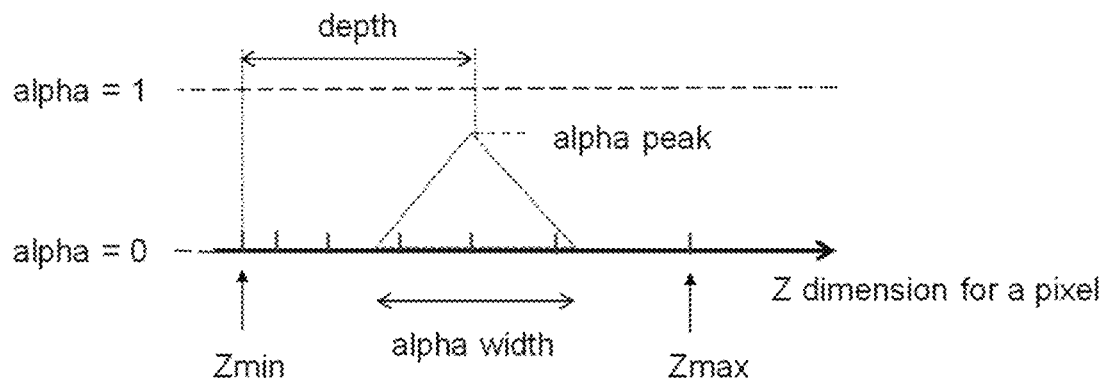
FIG. 7 illustrates how to determine the depth of a pixel, according to an embodiment.

To illustrate the depth map generation, we refer back to the example of FIG. 6 with the local MPI partition made of seven RGBA layers. On a given pixel position, there will be a plane between 31 and 37 where the alpha value reaches the maximum, and we call this the "peak plane" for that pixel. We can calculate the depth for that pixel as the difference between the "peak plane" index and the z-front of the partition that is equal to Zmin, as illustrated in FIG. 7. After calculating depths for all pixels of patch, we get a local depth map that is quantized in the same 1/z law as in the original MPI or in another law, for example, the uniform quantization law.

Expression of Alpha Waveform (440)

Figure 8:
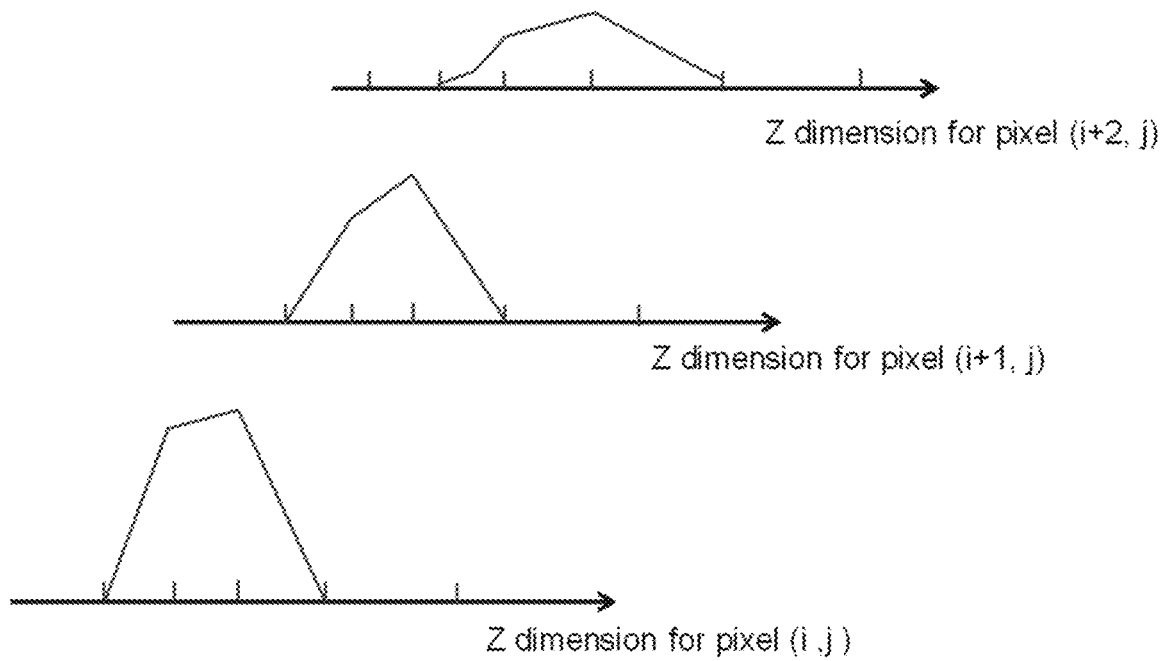
FIG. 8 illustrates examples of alpha waveforms of three neighboring pixels.

It is possible that the alpha value for some part of a partition does not have a well-defined peak with value 1, but rather a dome-shape succession of values with peak p<1 and a width of a few z-planes, as shown in an example of three neighboring pixels in row j: (i, j), (i+1, j), (i+2, j) in FIG. 8.

Because the succession of alpha values for each pixel (voxel) along a z-ray exhibits a form with peaks more or less spread out, for ease of notations, we denote the set of alpha values for each pixel along the z-ray as an alpha waveform. In order to convey the alpha values, it is proposed to add two 2D attributes to convey an elementary impulse for each pixel in a patch (in the MIV sense, an attribute layer is a 2D layer with same spatial sampling as the texture 2D attribute layer):
  a. The peak value for each pixel; and
  b. The width of the impulse.

Here we can assume the impulse is symmetric, and thus only one parameter is needed for the width, as illustrated in FIG. 7. Note that the width can take a value such that the impulse does not have to align with the z grids, namely, the impulse does not necessarily intersect the z-ray at z-plane locations of the MPI cube as shown in FIG. 7. Because for many patches, the surface is very clearly defined and localized, by default, the peak and the width for these patches are not indicated. In particular, in the default case, the peak of the impulse is inferred to be 1, and the absence of an alpha (peak) 2D attribute in a patch means that the alpha peak values of all pixels are 1 for that patch. By default also, the width of the impulse is inferred to be 1 (±0.5, no spread in alpha). The shape of the elementary impulse can be conveyed through metadata, or made explicit in the standard.

Figure 9:
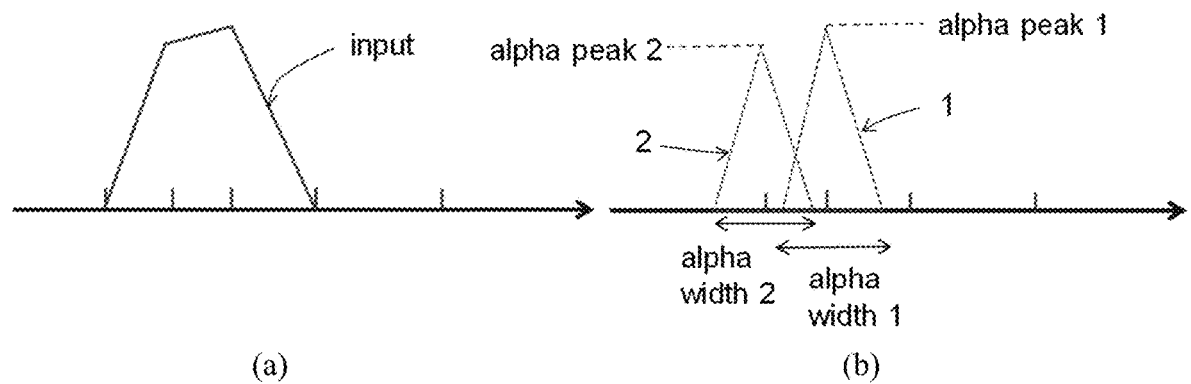
FIG. 9(a) and FIG. 9(b) illustrate an example of decomposing an alpha waveform into two elementary impulses, according to an embodiment.

Using the waveform for pixel (i, j) as the example, FIG. 9 illustrates how the alpha waveform of the original MPI can be decomposed into elementary waveforms. By using alpha peak and alpha width distribution information and also possibly defining patches very close to each other with intricate 3D footprint, it is possible to express fairly complex alpha shape. In the example as shown in FIG. 9, pixel (i, j) is projected into two patches: patch 1 and patch 2. The alpha waveform for pixel (i, j) is shown in FIG. 9(a). To decompose the alpha waveform, one or more elementary impulse, e.g., impulse 1 with alpha peak 1 and width 1, and impulse 2 with alpha peak 2 and width 2, are estimated for patch 1 as shown in FIG. 9(b). To estimate the elementary impulses, the number of impulses can be first estimated, for example, based on the local peaks of the alpha waveform. The peaks of the impulses can also be estimated based on the local peaks. Based on the estimated number of impulses and the estimated peaks, the widths may be estimated, for example, such that the combination of impulses closely approximate the input alpha waveform. At the end, these parameters allow to express and convey the notion of patch thickness in the z dimension.

The example of elementary waveform taken here is the triangle, and two patches correspond to pixel (i, j). It should be noted that the elementary waveform can take other shapes, and there can also be more than two patches corresponding to one pixel.

Figure 10:
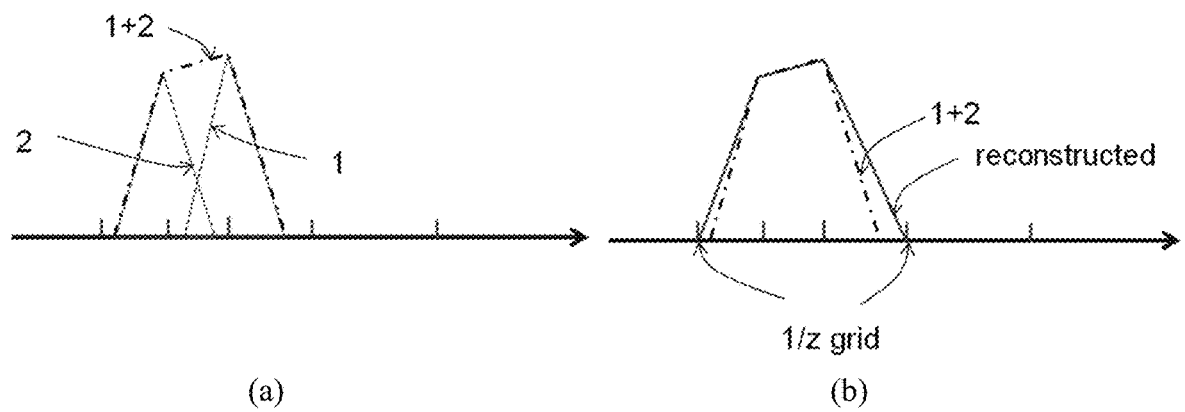
FIG. 10(a) and FIG. 10(b) illustrate an example of reconstructing an alpha waveform from two elementary impulses, according to an embodiment.

FIG. 10 illustrates how the alpha waveform can be reconstructed. For pixel (i, j), depth1, alpha peak 1 and width 1 (depth2, alpha peak 2 and width 2) are decoded from the bitstream for patch 1 (patch 2), and elementary impulse 1 associated with patch 1 (patch 2) is formed based on alpha peak 1 and width 1 (alpha peak 2 and width 2) at position depth 1 (depth 2). These two elementary impulses are added together, and the resulting waveform is illustrated in line "1+2" as shown in FIG. 10(a). Note that in MPI, the z-planes are located under a 1/z law. Thus, line "1+2" is adjusted to intersect the z-ray according to the 1/z law. For example, as shown in FIG. 10(b), line "1+2" is shifted to line "reconstructed" by keeping the peaks the same and aligning the intersections with the z-ray to 1/z grids. Because the combination of elementary impulses does not always exactly add up to the original alpha waveform during decomposition, the "reconstructed" alpha waveform may be different from the original "input" alpha waveform. The mismatch may also be caused due to the precisions of the parameters indicating the elementary impulses.

Expression of Waveforms for R, G and G

In addition, each voxel where alpha is non-zero in the original MPI have an RGB value. By default, it is sufficient to add a regular patch texture corresponding to the RGB value at the peak position (or an average value), and this can be delivered in the texture attribute layer according to the MIV specification.

It is also possible, although less frequent, that the RGB value of a pixel along its z-ray has slightly different color. It is then possible to apply the same procedure as for the alpha for the R, G and B waveforms separately, for the patches identified by the process related to alpha decomposition. Here, similar to the concept of the alpha waveform, we denote the set of R, G, B values for each pixel along the z-ray as an R waveform, G waveform, and B waveform, respectively.

Reduction of Pixel Rate

All the patch geometry (depth) and attributes as described above can be integrated in the MIV specification, and can be encoded (480) as video material, for example, using an HEVC video encoder in a consistent GoP/Intra-period scheme.

However, there may be a problem of pixel rate increase. The pixel rate is defined here as the cumulated number of values, knowing that the current MIV specification will convey a video frame of the same size as the texture for each of the new attributes which have been introduced above. For example, if the texture attribute is of size 4K×4K, all of the alpha peak, alpha width and possibly other RGB related distribution attributes will be 4K×4K or at least require a specific video stream. Duplicating the video stream is not good in terms of real time implementation.

In addition, it is very frequent that default values only are sufficient: fully opaque and well defined surfaces implying binary alpha value only, and usually only patches in challenging regions (e.g., tiny geometry, textureless parts) need a level of richness such as the one described above. The texture RGB attribute is video-coded as texture, but all the other extra attributes are scalar value and can be normalized down to [0, 1] range. In one embodiment, we can pack these extra attributes together or partly together onto the same attribute map, in order to reduce the number of video streams. The different components (geometry, texture attribute, extra attribute(s) with possibly alpha peak, alpha width and possibly for R, G, B as well) can then be encoded, for example, according to the extended MIV specification.

MPI Rendering

Figure 11:
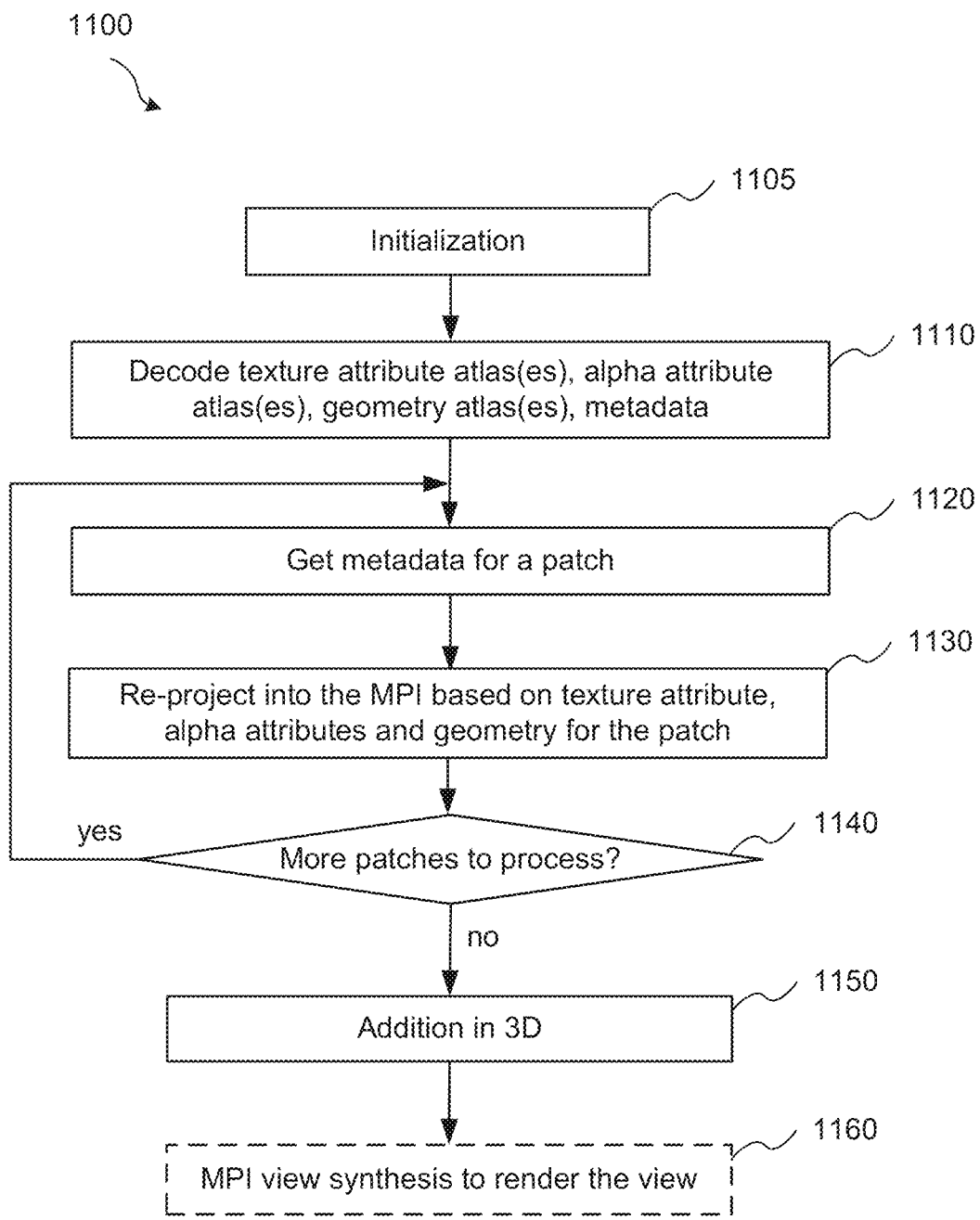
FIG. 11 illustrates a method of decoding an MIV representation to reconstruct an MPI representation, according to another embodiment.

FIG. 11 illustrates method 1100 for reconstructing a 3D scene in the MPI representation, according to an embodiment. The input of method 1100 can be the bitstream generated according to method 400. At step 1105, the decoder is initialized, for example, by setting the alpha values of all pixels to zero. At step 1110, the decoder can decode texture attribute atlas(es), alpha attribute atlas(es), geometry atlas(es), for example, using an HEVC decoder, and decode metadata, for example, using a parser of the succession of digital fields defined by the MIV specification. From the metadata, the decoder knows the number of patches in the bitstream and how the patches can be re-projected into the 3D scene.

For each patch, the metadata associated with the patch is obtained (1120). Here, the alpha impulse, if any, can be reconstructed based on the alpha peak and width. A portion in the MPI corresponding to the patch is re-projected (1130) based on the texture attribute, alpha attribute and geometry for the patch. Using the alpha impulse, if any, the re-projection may include the expansion in the width of the impulse: the patch has a thickness in z to re-synthetize. During re-projection, several successive planes of the MPI may be needed to be written with non-zero alpha values. The data for reconstructing the 3D scene in the MPI format is ready after all patches are processed (1140). The patches, possibly expanded in the z dimension, are assembled together to reconstructed the 3D scene in the MPI format (1150). The decoder may further render (1160) a view requested by the user using MPI view synthesis.

The MIV v1 specification makes no use of the alpha attribute, but the alpha attribute is allowed in the V3C spec as a new attribute in addition to the texture attribute. In order to support the use of the alpha attribute, the MIV specification can be extended for the carriage of MPI and indicate a typical method of using the alpha attribute during the viewport synthesis. For example, the hypothetical renderer can use the alpha value for computing the RGB value of a ray. To render a viewport, for each pixel of the viewport, a ray is cast from the viewport center and crosses the MPI cube (i.e., the ray intersects the planes in the MPI cube). Specifically, the value of the pixel in the viewport can be calculated by accumulating the RGB values intersecting that ray and with a weight related to the alpha value. That ray may for example, start from the foreground to the background planes, or start from the background to the foreground planes.

Change in Syntax

In the following, we provide an example of the changes made to the syntax of the MIV-V3C working draft 5:
1) The minimum and maximum normalized depth values, 1/Zmax and 1/Zmin respectively, in meters$^{-1}$ of the 3D scene, are specified at the patch level, in the MIV extension of the V3C patch data unit pdu_miv_extension(patchIdx) syntax structure, so as to express the local z with respect to local Zmin (e.g., pdu_norm_disp_low, pdu_norm_disp_high).
2) The presence of an extended attribute is specified at the patch level, in the MIV extension of the V3C patch data unit pdu_miv_extension(patchIdx) syntax structure, together with the packing location, size and orientation of the patch component within the patch atlas (e.g., pdu_attr_atlas_present_flag, pdu_attr_atlas_pos_x, pdu_attr_atlas_pos_y, pdu_attr_atlas_orientation_idx, pdu_attr_atlas_size_x_minus1, pdu_attr_atlas_size_y_minus1, asme_attr_frame_width_minus1, asme_attr_frame_width_minus1).
3) The packing of patch components of several extended attributes into a common atlas map is enabled and signaled at the atlas sequence parameters level, in the MIV extension of the V3C atlas sequence parameters asps_miv_extension( ) syntax structure (e.g., asme_ext_attr_frame_width_minus1, asme_ext_attr_frame_height_minus1).
4) The 'waveform' type used for alpha distribution is specified at a global level, for example at the atlas sequence level, in the MIV extension of the V3C atlas sequence parameters asps_miv_extension( ) syntax structure (e.g., asme_waveform_type).

Table 1 illustrates the syntax elements added to the pdu_miv_extension(patchIdx) syntax structure.

TABLE 1

| | Descriptor |
|---|---|
| pdu_miv_extension( patchIdx ) { | |
|   if( vme_max_entities_minus1 > 0 ) | |
|     pdu_entity_id[ patchIdx ] | u(v) |
|   if( asme_depth_occ_threshold_flag ) | |
|     pdu_depth_occ_threshold[ patchIdx ] | u(v) |
|   pdu_norm_disp_low[ patchIdx ] | fl(32) |
|   pdu_norm_disp_high[ patchIdx ] | fl(32) |
|   for( i = 1; i <= ai_attribute_count[ vuh_atlas_id ]; i++ ) { | |
|     pdu_attr_atlas_present_flag[ patchIdx ][ i ] | u(1) |
|     if( pdu_attr_atlas_present_flag[ patchIdx ][ i ] == 1 ) { | |
|       pdu_attr_atlas_pos_x[ patchIdx ][ i ] | ue(v) |
|       pdu_attr_atlas_pos_y[ patchIdx ][ i ] | ue(v) |
|       pdu_attr_atlas_orientation_idx[ patchIdx ][ i ] | u(v) |
|       pdu_attr_atlas_size_x_minus1[ patchIdx ][ i ] | ue(v) |
|       pdu_attr_atlas_size_y_minus1[ patchIdx ][ i ] | ue(v) |
|     } | |
|   } | |
| } | | pdu_norm_disp_low[patchIdx] and pdu_norm_disp_high[patchIdx] specify the minimum and maximum normalized disparity values, respectively, in meters$^{-1}$, of the part of the 3D scene represented by the patch with index PatchIdx.

pdu_attr_atlas_present_flag[patchIdx][i] equal to 1 indicates that the i-th attribute is present for the patch with index equal to patchIdx. pdu_attr_atlas_present_flag[patchIdx][i] equal to 0 indicates that the i-th attribute is not present.

pdu_attr_atlas_pos_x[patchIdx][i] and pdu_attr_atlas_pos_y[patchIdx][i] specify the horizontal and vertical coordinates, respectively, of the top-left corner of the component of the patch with index PatchIdx corresponding to the i-th attribute, in the current atlas frame.

pdu_attr_atlas_orientation_idx[patchIdx][i] indicates the orientation index of the component of the patch with index PatchIdx corresponding to the i-th attribute, in the current atlas frame.

pdu_attr_atlas_size_x_minus1[patchIdx][i]+1 specifies the width value of the component of the patch with index PatchIdx corresponding to the i-th attribute, in the current atlas frame.

pdu_attr_atlas_size_y_minus1[patchIdx][i]+1 specifies the height value of the component of the patch with index PatchIdx corresponding to the i-th attribute, in the current atlas frame.

Table 2 illustrates the syntax element added to the asps_miv_extension( ) syntax structure.

TABLE 2

| | Descriptor |
|---|---|
| asps_miv_extension ( ) { | |
|   asme_group_id | u(v) |
|   asme_auxiliary_atlas_flag | u(1) |
|   asme_depth_occ_threshold_flag | u(1) |
|   if( vme_geometry_scale_enabled_flag == 1 ) { | |
|     asme_geometry_frame_width_minus1 | u(v) |
|     asme_geometry_frame_height_minus1 | u(v) |
|   } | |
|   asme_extended_attributes_in_single_atlas_flag | u(1) |
|   if( asme_extended_attributes_in_single_atlas_flag == 0 ){ | |
|     for( i = 1; i <= ai_attribute_count[ vuh_atlas_id ]; i++ ) { | |
|       asme_attr_frame_width_minus1[ i ] | u(16) |

TABLE 2-continued

| | Descriptor |
|---|---|
| asme_attr_frame_height_minus1[ i ] | u(16) |
| } | |
| } | |
| else { | |
| asme_ext_attr_frame_width_minus_1 | u(16) |
| asme_ext_attr_frame_width_minus_1 | u(16) |
| } | |
| asme_waveform_type | u(3) |
| } | | asme_extended_attributes_in single_atlas_flag equal to 1 indicates that patch components corresponding to extended attributes (that is all attributes except texture attribute 0) are packed in a single atlas frame. asme_extended_attributes_in single_atlas_flag equal to 1 indicates that patch components corresponding to a given attribute with index i are packed in a separate atlas component frame with index i.

asme_attr_frame_width_minus1[i]+1 and asme_attr_frame_height_minus1[i]+1 specify the width and height, respectively, of the atlas frame component corresponding to the i-th attribute.

asme_ext_attr_frame_width_minus1+1 and asme_ext_attr_frame_height_minus1+1 specify the atlas frame width and height, respectively, when all extended attributes are packed in a single atlas frame.

asme_waveform_type indicates the elementary waveform type index for the alpha distribution. asme_waveform_type equal to 0 indicates a triangle shape. Values 1 to 7 are reserved for future use.

Figure 12:
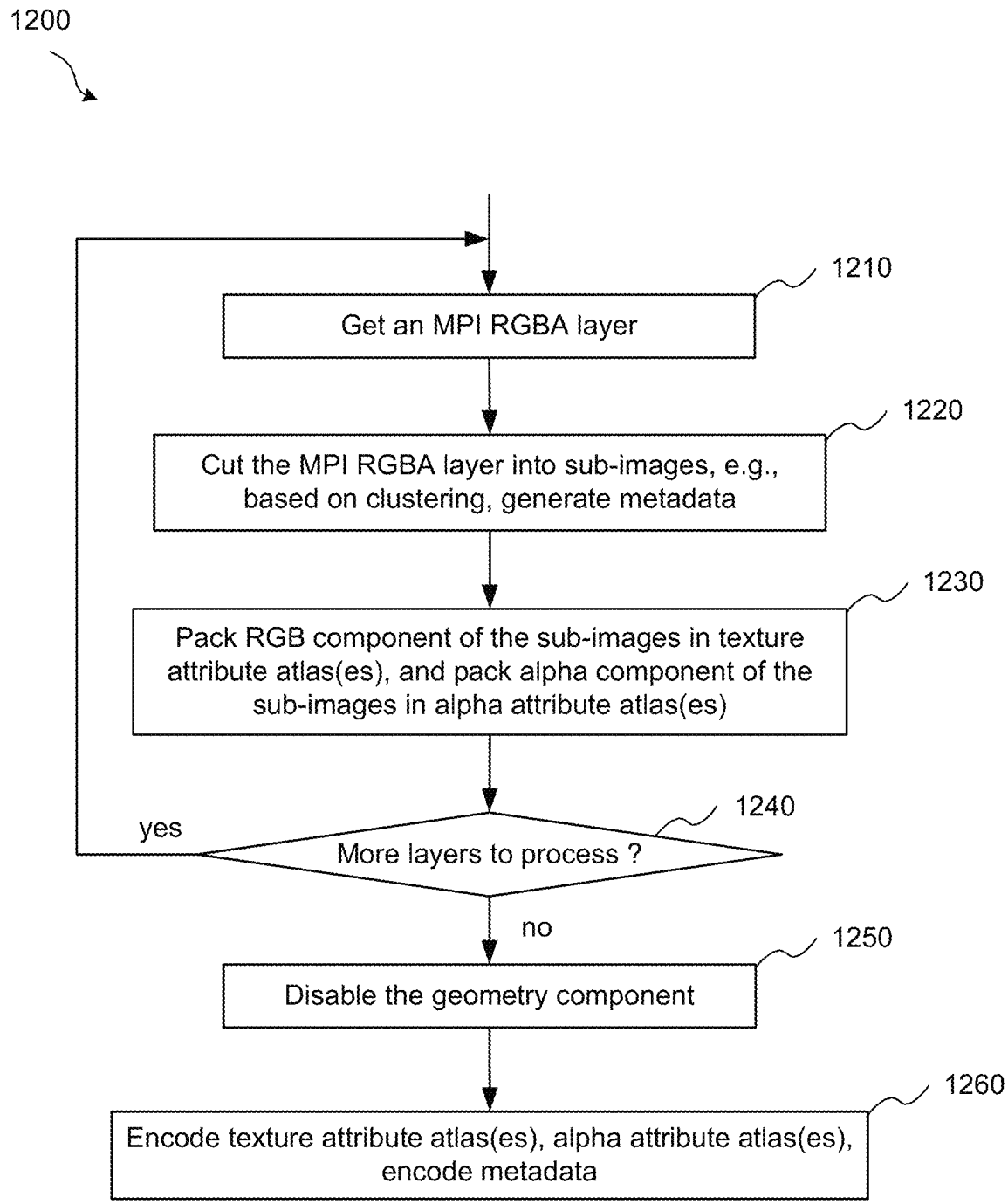
FIG. 12 illustrates a method of encoding a 3D scene in an MPI representation using an MIV representation, according to another embodiment.

Embodiment 2: Converting the MPI Planes Directly into Texture Attribute and No Geometry FIG. 12 illustrates method 1200 for converting an MPI representation to an MIV representation for transmission, according to another embodiment. In this embodiment, the conversion is performed on the basis of the RGBA layer.

In particular, at step 1210, an MPI RGBA layer is obtained. At step 1220, the encoder identifies parts where alpha is non-zero or above a small threshold, and cuts the MPI RGBA layer into sub-images, thus removing the majority part of the RGBA layer that is empty. This identification is made by observing the moving parts where alpha is non-zero or above a small threshold on all the frames of an intra-period through a time aggregation, like in embodiment 1. Each sub-image may correspond to a patch, and the RGB and alpha information of the sub-image will be assigned to the patch. Metadata can be generated, for example, to indicate the z-plane index of each patch or directly the z value of the plane. The per layer time aggregation allows the metadata to be sent at the rate of the intra-period only. Step 1220 can be performed by a clustering process based on alpha values. The alpha component of the RGBA layer is converted directly into an alpha scalar image to be conveyed, and the RGB image of the RGBA layer is to be conveyed as texture MIV attribute. The alpha component can be quantized to a reduced number of levels corresponding to a reduced number of bits, for example 4. These levels can be spread over the dynamic available for the video encoding stage or use only a part of this dynamic range. The value of these quantization levels should be part of the metadata in order to allow the dual operation at the decoder side.

Figure 13:
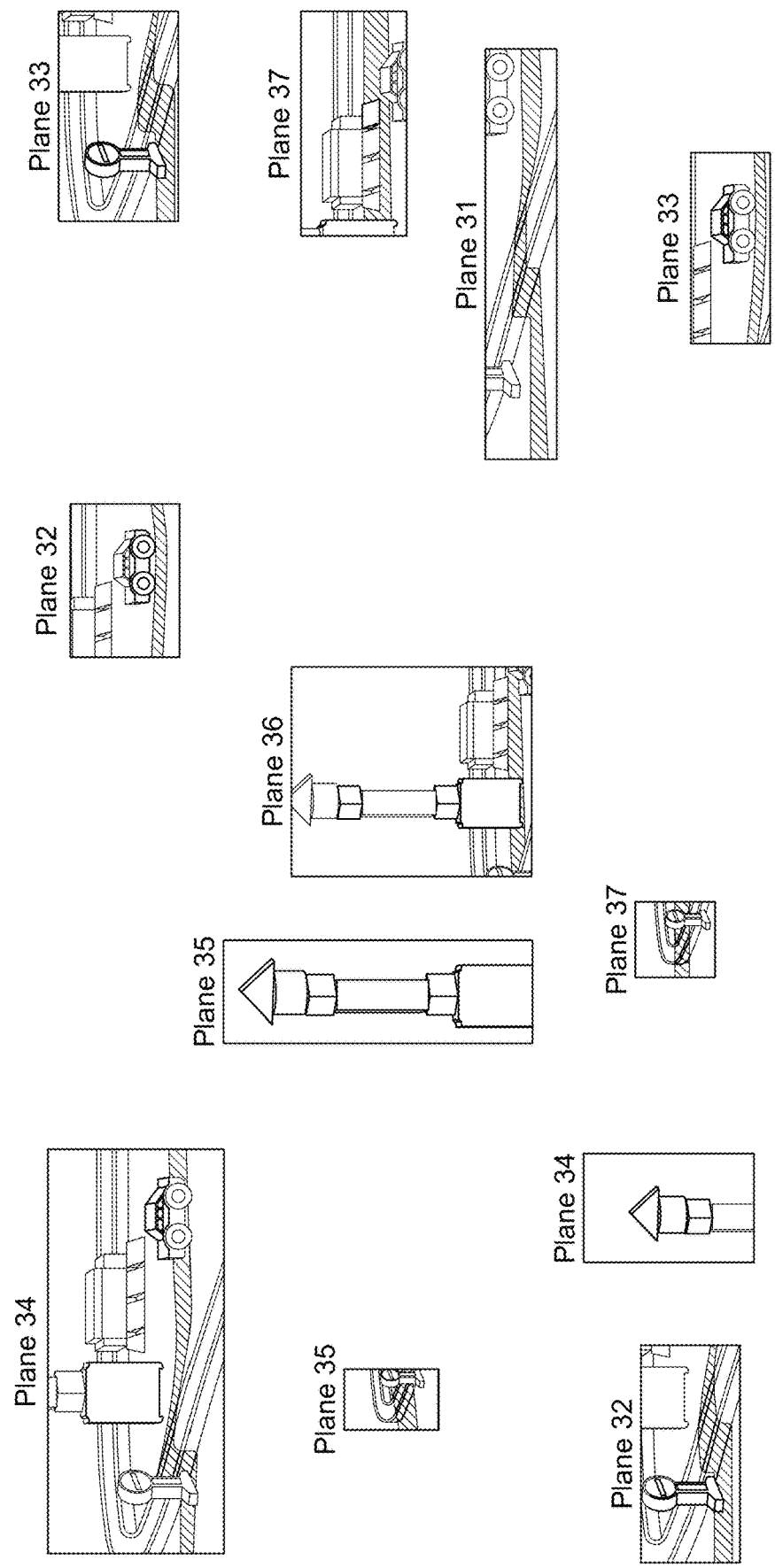
FIG. 13 illustrates an example of a texture attribute atlas with the z-plane number indicated, according to another embodiment.

FIG. 13 illustrates the packing of the sub-images into a texture attribute atlas. In addition to the usual patch metadata related to upper-left corner position, width and height in the atlas, the new metadata related to the plane is indicated in the figure. There should be another attribute in parallel related to the alpha value, which is packed in an identical manner.

At step 1230, the encoder packs the RGB component of these sub-images as patches in the texture attribute, for example, with attrIdx=0, and packs the alpha attribute component into one or more alpha attribute atlas(es), for example, with attrIdx=ATTR_TRANSPARENCY. The encoder repeats steps 1210-1230 until all RBGA layers in the MPI cube are processed (1240). At step 1250, the encoder disables the geometry component of MIV, for example, by referring to a component of empty size or adding a flag. In another example, the alpha attribute is conveyed at the place of the geometry (depth) component. The texture attribute atlases, and the geometry atlases if present, can be encoded (1260), for example, using an HEVC video encoder, and the metadata can be encoded. Other attributes, if present, can also be encoded. In another example, the alpha attribute is conveyed in the occupancy map, when this occupancy map is validated in the MIV profile. It corresponds in that case to binary alpha information.

Figure 14:
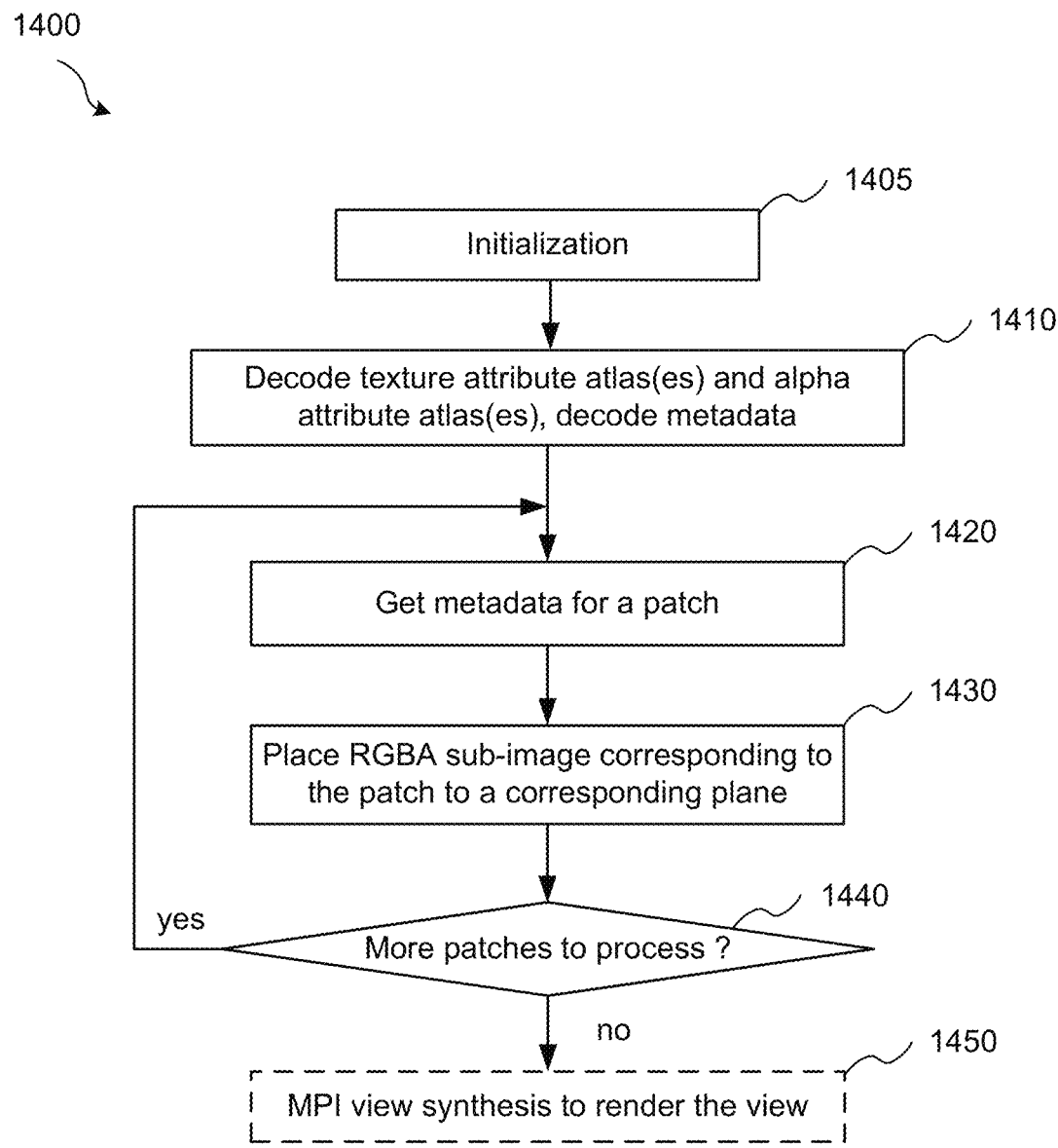
FIG. 14 illustrates a method of decoding an MIV representation to reconstruct an MPI representation, according to another embodiment.

FIG. 14 illustrates method 1400 for reconstructing a 3D scene in the MPI representation, according to another embodiment. The input of method 1400 can be the bitstream generated according to method 1300. At step 1405, the decoder is initialized, for example, by setting the alpha values of all pixels to zero. At step 1410, the decoder can decode texture attribute atlas(es) and alpha attribute atlas(es), for example, using an HEVC decoder, and decode metadata. From the metadata, the decoder knows the number of patches in the bitstream and which plane the patch correspond to.

For each patch, the metadata associated with the patch is obtained (1420). The texture attribute and alpha attribute are assigned (1430) to the RGB component and alpha component, respectively, of a corresponding portion in a corresponding plane in the MPI representation. The alpha attribute is regenerated according to the number of bits of the alpha quantization which is indicated as metadata. The 3D scene is completely reconstructed in the MPI format after all patches are processed (1440). The decoder may further render (1450) a view requested by the user using MPI view synthesis, similar to step 1160 in method 1100. The method is equivalent when the alpha information is conveyed on the geometry or on the occupancy map.

Two embodiments are described above. The advantage of embodiment 1 is that the use of a depth map allows to generate 2D patches that are easier to encode with a video encoder than the sub-images generated according to embodiment 2. As can be seen from FIG. 13, there may be some elongated sub-images, which makes packing the sub-images efficiently to the texture attribute atlases more challenging. Therefore, a more significant pixel rate reduction is expected from embodiment 1. However, embodiment 2 is conceptually simpler.

In the above, we mainly describe the conversion of the MPI scene representation, in order to convey the MPI information using the MIV-V3C standard. The present methods can also be applied to cover other scene representations with a non-binary alpha layer, where the scene is represented not only with well determined thin surface but volumetrically. In addition, the present methods are not limited to the MIV-V3C standard, and it can be the more generic V3C part or the V-PCC part of V3C, or any standard related to the transmission format of volumetric scene with inputs in perspective, orthographic or equirectangular format. In case of an omnidirectional scene or a scene with very large field of view inputs, the mechanisms presented in embodiments 1 and 2 are still valid if the fronto-parallel planes are replaced by spheres or portion of spheres. The former perspective projection needs then to be replaced by an adapted projection like equirectangular projection (like ERP) or cubemap projection (CMP) or other close derivatives.

In the above, the z-planes are located according to 1/z law. It should be noted that the present method can also be applied when a simple scaling law is used, for example, for orthographic view. In addition, a patch is considered to be rectangular, similar to what is in MIV v1. However, the patch is not necessarily rectangular, and it can be in other shapes, for example, circular.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Unless indicated otherwise, or technically precluded, the aspects described in this application can be used individually or in combination. Various numeric values are used in the present application. The specific values are for example purposes and the aspects described are not limited to these specific values.

Note that the syntax elements as used herein are descriptive terms. As such, they do not preclude the use of other syntax element names. In the above, the syntax elements for pdu_miv_extension( ) and asps_miv_extension( ) are mainly used to illustrate various embodiments. It should be noted that these syntax elements can be placed in other syntax structures.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
    decoding texture attributes, geometry attributes, and alpha attributes of a plurality of patches from a bitstream;
    for each patch of said plurality of patches:
        obtaining texture attribute, geometry attribute and alpha attribute for a patch, wherein alpha attribute for a pixel in said patch is represented as a waveform along z-ray; and
        projecting said patch into a plurality of planes of a partition in an MPI (Multiplane Image) cube representing a 3D scene, based on said texture attribute, geometry attribute and alpha attribute for said patch.

2. The method of claim 1, further comprising:
    decoding one or more texture attribute atlases, one or more geometry attribute atlases, and one or more alpha attribute atlases, wherein said texture attributes, geometry attributes, and alpha attributes are obtained from said decoded one or more texture attribute atlases, said one or more geometry attribute atlases, and said one or more alpha attribute atlases.

3. The method of claim 1, further comprising:
    decoding metadata indicating at least one of position of a patch in an atlas, width and height of a patch, a corresponding partition for a patch, position of a patch in a corresponding partition, and a number of patches in said bitstream.

4. The method of claim 1, wherein said waveform for alpha attribute is represented as an impulse, and wherein said impulse is associated with at least a parameter corresponding to a peak value of said impulse and a parameter indicating a width of said impulse.

5. The method of claim 4, wherein two or more patches are projected to said partition, and wherein impulses for said two or more patches are added to form a set of alpha values along z-ray for said partition.

6. A method, comprising:
    splitting an MPI (Multiplane Image) cube representing a 3D scene into a plurality of partitions;
    for each partition of said plurality of partitions:
        projecting a partition to one or more patches, each patch is associated with texture attribute, geometry attribute, and alpha attribute, wherein alpha attribute for a pixel in a patch is represented as a waveform along z-ray; and
        encoding texture attributes, geometry attributes, and alpha attributes for said one or more patches into a bitstream.

7. The method of claim 6, further comprising:
    packing said texture attributes for said one or more patches into one or more texture attribute atlases;
    packing said geometry attributes for said one or more patches into one or more geometry attribute atlases; and
    packing said alpha attributes for said one or more patches into one or more alpha attribute atlases, wherein said one or more texture attribute atlases, said one or more geometry attribute atlases, and one or more alpha attribute atlases are encoded into said bitstream.

8. The method of claim 6, wherein a depth associated with a pixel for a patch is generated responsive to a peak alpha value for said pixel in a partition corresponding to said patch.

9. The method of claim 8, wherein said depth associated with said pixel for said patch is generated responsive to a difference of said peak alpha value for said pixel and a depth of a z-front of said corresponding partition.

10. The method of claim 6, wherein said waveform for alpha attribute is represented as an impulse, and wherein said impulse is associated with at least a parameter corresponding to a peak value of said impulse and a parameter indicating a width of said impulse.

11. An apparatus, comprising:
    at least one memory and one or more processors, wherein said one or more processors are configured to:
    decode texture attributes, geometry attributes, and alpha attributes of a plurality of patches from a bitstream;
    for each patch of said plurality of patches:
        obtain texture attribute, geometry attribute and alpha attribute for a patch, wherein alpha attribute for a pixel in said patch is represented as a waveform along z-ray; and
        project said patch into a plurality of planes of a partition in an MPI (Multiplane Image) cube representing a 3D scene, based on said texture attribute, geometry attribute and alpha attribute for said patch.

12. The apparatus of claim 11, wherein said one or more processors are further configured to:
    decode one or more texture attribute atlases, one or more geometry attribute atlases, and one or more alpha attribute atlases, wherein said texture attributes, geometry attributes, and alpha attributes are obtained from said decoded one or more texture attribute atlases, said one or more geometry attribute atlases, and said one or more alpha attribute atlases.

13. The apparatus of claim 11, wherein said one or more processors are further configured to:
    decode metadata indicating at least one of position of a patch in an atlas, width and height of a patch, a corresponding partition for a patch, position of a patch in a corresponding partition, and a number of patches in said bitstream.

14. The apparatus of claim 11, wherein said waveform for alpha attribute is represented as an impulse, and wherein said impulse is associated with at least a parameter corresponding to a peak value of said impulse and a parameter indicating a width of said impulse.

15. The apparatus of claim 14, wherein two or more patches are projected to said partition, and wherein impulses for said two or more patches are added to form a set of alpha values along z-ray for said partition.

16. An apparatus, comprising:
    at least one memory and one or more processors, wherein said one or more processors are configured to:
    splitting an MPI (Multiplane Image) cube representing a 3D scene into a plurality of partitions;
    for each partition of said plurality of partitions:
        projecting a partition to one or more patches, each patch is associated with texture attribute, geometry attribute, and alpha attribute, wherein alpha attribute for a pixel in a patch is represented as a waveform along z-ray; and encoding texture attributes, geometry attributes, and alpha attributes for said one or more patches into a bitstream.

17. The apparatus of claim 16, wherein the one or more processors are further configured to:

pack said texture attributes for said one or more patches into one or more texture attribute atlases;

pack said geometry attributes for said one or more patches into one or more geometry attribute atlases; and pack said alpha attributes for said one or more patches into one or more alpha attribute atlases, wherein said one or more texture attribute atlases, said one or more geometry attribute atlases, and one or more alpha attribute atlases are encoded into said bitstream.

18. The apparatus of claim 16, wherein a depth associated with a pixel for a patch is generated responsive to a peak alpha value for said pixel in a partition corresponding to said patch.

19. The apparatus of claim 18, wherein said depth associated with said pixel for said patch is generated responsive to a difference of said peak alpha value for said pixel and a depth of a z-front of said corresponding partition.

20. The apparatus of claim 16, wherein said waveform for alpha attribute is represented as an impulse, and wherein said impulse is associated with at least a parameter corresponding to a peak value of said impulse and a parameter indicating a width of said impulse.

* * * * *